US010429523B2

(12) United States Patent
Ramsden

(10) Patent No.: US 10,429,523 B2
(45) Date of Patent: Oct. 1, 2019

(54) APPARATUS AND METHODS FOR GAMMA RAY DETECTION

(71) Applicant: Symetrica Limited, Southampton, Hampshire (GB)

(72) Inventor: David Ramsden, Southampton (GB)

(73) Assignee: Symetrica Limited, Southampton (GB)

( * ) Notice: Subject to any disclaimer, the term of this patent is extended or adjusted under 35 U.S.C. 154(b) by 0 days.

(21) Appl. No.: 15/110,401

(22) PCT Filed: Dec. 10, 2014

(86) PCT No.: PCT/GB2014/053651
§ 371 (c)(1),
(2) Date: Jul. 7, 2016

(87) PCT Pub. No.: WO2015/104529
PCT Pub. Date: Jul. 16, 2015

(65) Prior Publication Data
US 2016/0334519 A1    Nov. 17, 2016

(30) Foreign Application Priority Data

Jan. 8, 2014 (GB) .................................. 1400266.1

(51) Int. Cl.
*G01T 1/20* (2006.01)
*G01T 1/203* (2006.01)

(52) U.S. Cl.
CPC .............. *G01T 1/2033* (2013.01); *G01T 1/20* (2013.01); *G01T 1/2002* (2013.01); *G01T 1/203* (2013.01); *G01T 1/2018* (2013.01)

(58) Field of Classification Search
CPC ......... G01T 1/00; G01T 1/202; G01T 1/2002; G01T 1/2033; G01T 1/2018; G01T 1/203; G01T 1/20
See application file for complete search history.

(56) References Cited

U.S. PATENT DOCUMENTS 5,006,714 A * 4/1991 Attix ...................... G01T 1/169
250/252.1
5,241,180 A * 8/1993 Ishaque .................. G01T 1/202
250/361 R (Continued)

FOREIGN PATENT DOCUMENTS

EP    2 360 493 A1    8/2011
GB    2 418 015 A    3/2006

(Continued)

OTHER PUBLICATIONS

Votaw et al., "Optimal detector geometry to maximize light output and timing characteristics of fast scintillators," Feb. 1988, IEEE Transactions on Nuclear Science. vol. 35, No. 1, pp. 712-716. (Year: 1988).*

(Continued)

*Primary Examiner* — Kiho Kim
(74) *Attorney, Agent, or Firm* — Fitzsimmons IP Law

(57) ABSTRACT

A gamma ray detector is described. The detector comprises a plastic scintillation body for receiving gamma rays and generating photons in response thereto. The scintillation body is in the form of a truncated cone defined by a base surface and an end surface separated along an axis of extent of the scintillation body with a lateral surface extending therebetween. A photodetector is optically coupled to the base surface of the scintillation body so as to detect photons generated by gamma ray interaction events within the scintillation body. A specular reflector is provided adjacent, but separated from, the lateral surface of the scintillation body so as to reflect photons that leave the scintillation body through the lateral surface back into the scintillation body.

19 Claims, 4 Drawing Sheets

(56) References Cited

U.S. PATENT DOCUMENTS

| | | | | |
|---|---|---|---|---|
| 5,753,918 | A * | 5/1998 | Pandelisev | G01T 1/2002 250/269.1 |
| 7,683,336 | B2 * | 3/2010 | Ramsden | G01T 1/2002 250/368 |
| 9,075,149 | B2 * | 7/2015 | Flamanc | G01T 1/2018 |
| 2002/0117625 | A1 | 8/2002 | Pandelisev | |
| 2012/0100039 | A1 * | 4/2012 | Appeaning | A61L 2/088 422/22 |
| 2012/0161011 | A1 * | 6/2012 | Menge | G01T 1/2002 250/361 R |
| 2013/0020488 | A1 | 1/2013 | Flamanc et al. | |
| 2013/0306876 | A1 * | 11/2013 | Uchida | G01T 1/1644 250/366 |
| 2014/0175296 | A1 * | 6/2014 | Benlloch Baviera | G01T 1/2002 250/366 |

FOREIGN PATENT DOCUMENTS

| | | |
|---|---|---|
| GB | 2 437 979 A | 11/2007 |
| GB | 2 463 707 A | 3/2010 |
| WO | WO 90/05922 | 5/1990 |
| WO | WO 2007/132139 A1 | 11/2007 |

OTHER PUBLICATIONS

N. J. Cherepy et al.; Bismuth-Loaded Plastic Scintillators for Gamma Spectoscopy and Neutron Active Interrogation; IEEE Nuclear Science Symposium and Medical Imaging Conference Record; Paper N41-3; 2012; pp. 1972-1973; Anaheim, California, USA.

* cited by examiner

APPARATUS AND METHODS FOR GAMMA RAY DETECTION

BACKGROUND ART

The invention relates to gamma ray detector and methods of gamma ray detection, and in particular to scintillator-based gamma ray detectors and methods of gamma ray detection for use in gamma ray spectrometers.

Gamma ray spectrometers are used in a wide variety of applications, for example to identify and monitor gamma ray sources in scientific, industrial, and environmental monitoring applications, e.g. for security screening of personnel and cargo at border crossings, or to search generally for orphaned radioactive sources. A common class of gamma ray spectrometers is based on organic (plastic) or inorganic (crystal) scintillator materials.

FIG. 1 shows an example of a conventional scintillation spectrometer 2. The spectrometer comprises a scintillation body 4 which scintillates when a gamma ray is absorbed within it. Some common scintillator materials include crystals, such as thallium doped sodium iodide (NaI(Tl)), and plastics, such as polyvinyltoluene (PVT).

The scintillation body 4 is surrounded by a diffuse reflector 6. The diffuse reflector 6 may comprise a white powder, such as $Al_2O_3$, packed around the scintillation body 4, or a white tape, such as Teflon tape, wrapped around the scintillator body 4. For large plastic scintillation bodies it is known to wrap the scintillation body in crinkled metal foil and it is also known to optically bond a reflector to edges of a plastic scintillation body that have poor optical characteristics.

Gamma rays from a source enter the spectrometer and interact with the scintillation body 4 in scintillation events in which lower-energy photons are generated, e.g. optical photons. The intensity of the flash of lower-energy photons depends on the amount of the energy of the incident gamma ray deposited in the body. The scintillation body 4 is optically coupled to a photomultiplier tube (PMT) 10 on an end opposite a front face 8 of the scintillation body 4. The PMT 10 is for detecting photons generated in the scintillation body 4 in gamma ray detection events. Thus the PMT 10 is operable to output a signal S indicative of the intensity of the scintillation flash generated in the body 4 in response to each gamma ray interaction.

Output signals S from the PMT 10 are routed to a spectrum analyser 11, e.g. a multi-channel analyser. The amplitudes of the respective output signals S are indicative of the energy of the corresponding incident gamma rays deposited in the scintillation body. The relationship between an energy deposit in the scintillation body 4 and a resulting output signal S is defined by a response function of the detector.

The spectrum analyser 11 is operable to process the output signals S received from the PMT in a given integration time (or in an accumulating manner) and to generate an energy loss spectrum for the corresponding detection events. To do this the spectrum analyser 11 converts the measured output signals S to estimates of the energy deposited D in the gamma ray detector in the corresponding events.

Some applications of gamma ray spectrometers require large-volume detectors. Plastic scintillation material (e.g. PVT) is widely used to provide large-volume detectors for both charged particle and gamma ray detection. Other plastic based scintillators include materials that can be loaded with either high-Z fluor materials such as those described by Cherepy et al in Nuclear Science Symposium, Paper N41-3 Conference record (Anaheim) 2012 [4], including 9-vinyl carbazole, or other high-Z loaded nano-composite materials. For security applications, detectors having volumes of up to ~30 liters or so are in widespread use to detect gamma ray emitting isotopes which might be concealed in cargo at ports and other border-crossing points. These generally take the form of large rectangular slabs of material and are frequently viewed by two or more small photomultipliers in order to compensate for the intrinsically poor light-collection efficiency of the design. The detectors can rely on coincident signal detection from the two photomultiplier tubes to distinguish between weak optical signals associated with gamma ray detection events and photo-multiplier noise. Following the detection of a potential radio-active material, it is typically necessary to detain the relevant cargo/vehicle for secondary inspection, for example using a hand-held spectrometer of sufficient quality to be able to identify the nature of the radioactive material reliably.

Previously, plastic scintillator materials have not been regarded as suitable for applications where spectroscopic information is required. However, through the application of careful optical design and techniques for de-convolving raw energy-loss spectra and the use of a continuous stabilization and calibration techniques (e.g. as disclosed in GB 2 437 979 [1], GB 2 418 015 [2] and GB 2 463 707 [3]), it has become possible to extract useful spectroscopic information from large volume plastic detectors.

Nonetheless, there remains a desire to provide gamma ray detectors from which still further improved spectroscopic information can be obtained.

SUMMARY OF THE INVENTION

According to a first aspect of the invention there is provided a gamma ray detector comprising: a plastic scintillation body for receiving gamma rays and generating photons in response thereto, wherein the scintillation body is in the form of a truncated cone defined by a base surface and an end surface separated along an axis of extent of the scintillation body with a lateral surface extending therebetween, the base surface being larger than the end surface; a photodetector optically coupled to the base surface of the scintillation body so as to detect photons generated by gamma ray interaction events within the scintillation body; and a specular reflector provided adjacent the lateral surface of the scintillation body so as to reflect photons that leave the scintillation body through the lateral surface back into the scintillation body.

The lateral surface may be a smoothly machined surface to promote total internal reflection.

In accordance with certain embodiments the scintillation body has a volume of at least an amount selected from the group comprising: 1; 2; 3; 5; 10; 15; 20; 25 and 30 liters.

In accordance with certain embodiments the base surface of the scintillation body has an area of at least an amount selected from the group comprising: 1000 $mm^2$; 1500 $mm^2$; 2000 $mm^2$; 2500 $mm^2$; 3000 $mm^2$; 5000 $mm^2$; 10,000 $mm^2$; 15,000 $mm^2$; 20,000 $mm^2$ and 25,000 $mm^2$.

In accordance with certain embodiments the end surface of the scintillation body has an area of at least an amount selected from the group comprising: 500 $mm^2$; 1000 $mm^2$; 1500 $mm^2$; 2000 $mm^2$; 2500 $mm^2$; 3000 $mm^2$; 5000 $mm^2$; 10,000 $mm^2$; 15,000 $mm^2$ and 20,000 $mm^2$.

In accordance with certain embodiments the area of the base surface of the scintillation body is greater than the area of the end surface of the scintillation body by a ratio in a range selected from the group comprising: 1.3 to 2.0; 1.4 to 1.9; and 1.5 to 1.8.

In accordance with certain embodiments the length of the scintillation body along its axis of extent is at least an amount selected from the group comprising: 300 mm; 400 mm; 500 mm; 600 mm; 700 mm; 800 mm; 900 mm; 1000 mm; 1100 mm; 1200 mm; 1300 mm; 1400 mm; 1500 mm; 1600 mm; 1700 mm; 1800 mm; 1900 mm and 2000 mm.

In accordance with certain embodiments an interior angle between the base surface of the scintillation body and the lateral surface of the scintillation body in a plane that is normal to the lateral surface is greater than at least an amount selected from the group comprising: 75 degrees; 80 degrees; 85 degrees; 86 degrees; 87 degrees; 88 degrees and 89 degrees.

In accordance with certain embodiments the base surface of the scintillation body has a shape corresponding to a regular polygon.

In accordance with certain embodiments the scintillation body is in the form of a truncated circular cone.

In accordance with certain embodiments a width of the base surface of the scintillation body is matched to a width of the photodetector's sensitive surface.

In accordance with certain embodiments the scintillation body comprises polyvinyltoluene and/or polystyrene and/or polyethylene naphthalate.

In accordance with certain embodiments the lateral surface of the scintillation body consist of machined faces.

In accordance with certain embodiments the specular reflector adjacent the lateral surface comprises a metallic surface.

In accordance with certain embodiments the specular reflector adjacent the lateral surface comprises a reflecting film on a substrate.

In accordance with certain embodiments the detector further comprises an end-reflector optically bonded to the end surface of the scintillation body.

In accordance with certain embodiments the detector further comprises a light guide element for optically coupling the base surface of the scintillation body to the photodetector.

According to a second aspect of the invention there is provided a gamma ray spectrometer comprising the gamma ray detector of the first aspect of the invention and a spectrum analyser configured to receive output signals from the photodetector and to generate an energy loss spectrum for gamma-ray interactions in the scintillation body therefrom.

In accordance with certain embodiments the spectrum analyser is further configured to processing the energy loss spectrum by deconvolution using a response function computed for the gamma ray detector.

According to a third aspect of the invention there is provided a method of detecting gamma rays comprising: providing a scintillation body for receiving gamma rays and generating photons in response thereto, wherein the scintillation body is in the form of a truncated cone defined by a base surface and an end surface separated along an axis of extent of the scintillation body with a lateral surface extending therebetween, the base surface being larger than the end surface; providing a photodetector optically coupled to the base surface of the scintillation body so as to detect photons generated by gamma ray interaction events within the scintillation body; providing a specular reflector provided adjacent the lateral surface of the scintillation body so as to reflect photons that leave the scintillation body through the lateral surface back into the scintillation body; and detecting output signals from the photodetector.

It will be appreciated that features and aspects of the invention described above in relation to the first and other aspects of the invention are equally applicable to, and may be combined with, embodiments of the invention according to other aspects of the invention as appropriate, and not just in the specific combinations described above.

BRIEF DESCRIPTION OF THE DRAWINGS

For a better understanding of the invention and to show how the same may be carried into effect reference is now made by way of example to the accompanying drawings in which.

DETAILED DESCRIPTION

The inventors have recognized how consideration of a gamma ray detector's light collection efficiency (LCE) can be one area that plays an important role in determining a plastic scintillator based gamma ray detector's spectroscopic abilities. The LCE for a detector is a measure of the fraction of photons generated in a gamma-ray interaction which reach the sensitive area of the photodetector system being used to view the scintillation body. The inventors have recognized it can be important to design plastic scintillator based gamma ray detectors to seek to increase the detectors' LCE while at the same time reducing variations of LCE as a function of the location of gamma ray interaction events within the scintillation body.

Figure 1:
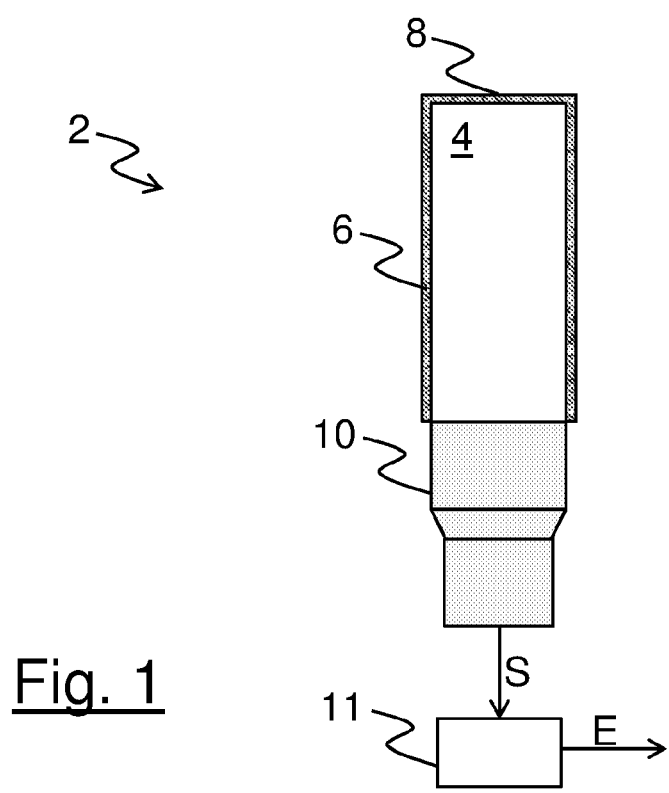
FIG. 1 schematically shows a conventional scintillator-based gamma ray spectrometer.
Figure 2:
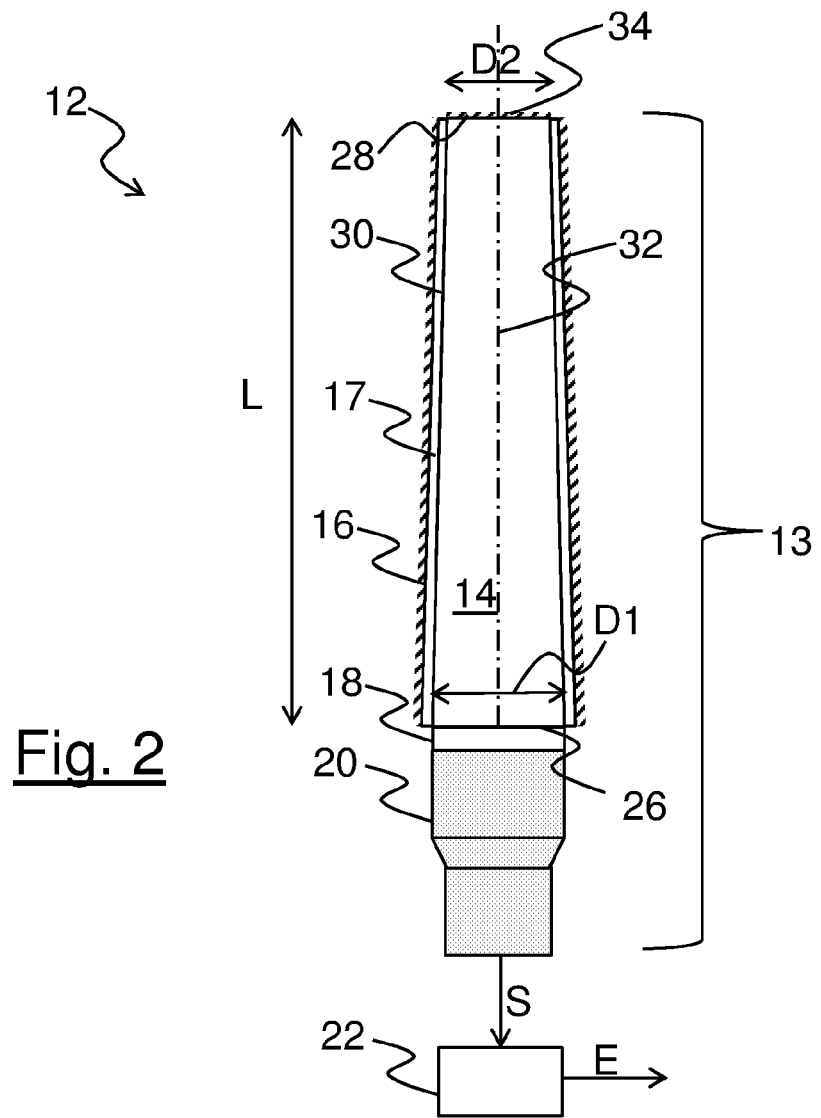
FIG. 2 schematically shows a scintillator-based gamma ray spectrometer comprising a gamma ray detector according to an embodiment of the invention.

FIG. 2 schematically represents in accordance with an embodiment of the invention a gamma ray spectrometer 12 comprising a gamma ray detector 13 and a spectrum analyser 22.

The gamma ray detector 13 is based on a plastic scintillation body 14 formed from a conventional plastic scintillator material in the form of a truncated cone. In this example the material comprising the plastic scintillation body 14 is polyvinyltoluene (PVT), but other materials may be used, for example polystyrene or polyethylene naphthalate (PEN), or a combination of these materials. The truncated cone forming the scintillation body 14 is defined by a base surface 26 and an end surface 28 separated along an axis of extent 32 of the scintillation body with a lateral surface 30 extending therebetween. In this example the truncated cone is a truncated square pyramid. That is to say, the cross-section of the truncated cone in a plane perpendicular to the axis of extent 32 is generally square, as schematically represented in perspective view in FIG. 3. The base surface 26 has a width D1 and the end surface 28 has a width D2. The scintillation body has a length L along its axis of extent 32. In this specific example the base surface 26 has a width (characteristic extent) of D1=80 mm, the end surface 28 has a width (characteristic extent) of D2=60 mm, and the scintillation body has a length (characteristic extent)

of L=800 mm. Thus the scintillation body has a volume of around 4 liters and the internal angle between the base end 26 and the respective faces comprising the lateral surface 30 is just over 89 degrees. The characteristic linear extent of the base surface 26 is approximately 1.3 times larger than the corresponding characteristic extent of the end surface 28, and consequently, the area of the base surface 26 for this particular example is approximately 1.8 times larger than the area of the end surface 28. The scintillation body 14 is cast in accordance with generally conventional techniques, and then the surfaces of the scintillation body, and in particular the lateral surfaces, may be machined, for example by diamond milling, to provide a surface that promotes total internal reflection (TIR) for photons travelling within the scintillation body.

The gamma ray detector 13 further comprises a specular reflecting surface 16 adjacent the lateral surfaces 30 of the scintillation body 14. In this example the reflecting surface comprises thin aluminium sheeting, for example around 0.5 mm in thickness, to which a reflective film, for example Vikuiti® Enhanced Specular Reflector (ESR) film, has been bonded. In other embodiments the reflecting surface 16 may, for example, comprise a polished metallic surface. The reflecting surface 16 in this example is arranged around the entirety of the lateral surface 30 with each face of the lateral surface 30 being covered by a correspondingly-sized sheet of the material providing the reflecting surface 16. In effect, the lateral surfaces 30 of the scintillation body 14 is clad by the reflecting surface 16. The reflecting surface 16 is positioned adjacent to the lateral surface 30 of the scintillation body 14 so that it is not in optical contact with the lateral surface 30 of the scintillation body 14. That is to say, there is a gap 17 between the lateral surface 30 of the scintillation body 14 and the overlying reflecting surface 16 so that photons may in effect leave the scintillation body 14 before interacting with the reflecting surface. The size of the gap 17 relative to the other elements of the detector 13 will typically be smaller than that represented in FIG. 2. In particular, the gap 17 might only be sufficiently large to ensure TIR is not frustrated from occurring within the scintillation body 14 over the majority of the lateral surface 30 adjacent the reflecting surface 16. For example, the gap 17 might only be on the order of a few wavelengths of the photons generated in response gamma ray interactions. Accordingly, the gap 17 may be provided by the reflecting surface 30 simply being placed against the lateral surface 30 in loose contact to help ensure TIR occurring for photons generated within the scintillation body 14 is not significantly disrupted by the reflecting surface. However, for photons that are incident on the lateral surface 30 of the scintillation body 14 at an angle which is too steep for TIR to occur such that they exit the scintillation body 14, the reflecting surface 16 provides a specular reflector to help reflect these photons back into the scintillation body 14. By placing the reflecting surface 16 against the lateral surface 30 there may be points of contact where the reflecting surface could disrupt TIR over small areas of the lateral surface, but TIR will nonetheless still occur over the majority of the lateral surface.

In the particular example embodiment represented in FIG. 2 the scintillation body also has a specular reflector 34 optically bonded to the end surface 28. The specular reflector 34 may also comprise a reflective film, such as Vikuiti® Enhanced Specular Reflector (ESR) film.

The gamma ray detector 13 further comprises a photodetector 20 optically coupled to the base surface 26 of the scintillation body 14 so as to detect photons generated by gamma ray interaction events within the scintillation body 14. In this example the photodetector 20 is optically coupled to the scintillation body 14 via a light guide element 18. The light guide element 18 has a length between the scintillation body 14 and the photodetector 20 of around 20 mm and its characteristics are matched to the scintillation body 14 and the photodetector 20 (e.g. in terms of size and refractive index) in accordance with conventional techniques. The photodetector 20 in this example is a photomultiplier tube (PMT), but other photodetector technologies could be used. For example, semiconductor-based detectors, such as silicon PIN diodes or silicon photomultipliers, may be used in some embodiments. The photodetector 20 in the example represented in FIG. 2 is configured to operate generally in accordance with conventional techniques for photodetection in gamma ray scintillation detectors to detect photons associated with gamma interactions within the scintillation body 14 and to generate a corresponding output signals S in response thereto.

The output signals S from the photodetector 20 of the gamma ray detector 13 are received by the spectrum analyser 22. The spectrum analyser 22 may, for example, be based on conventional spectrum analysing techniques known for use with gamma ray scintillation detectors. The spectrum analyser 22 is configured to generate an energy loss spectrum for gamma-ray interactions in the scintillation body based on the output signals S received from the photodetector 20. The spectrum analyser 22 is further configured to process the generated energy loss spectrum by deconvolution using a response function computed for the gamma ray detector in accordance with conventional techniques. The spectrum analyzer 22 is configured to output a representation of the deconvolved energy-loss spectrum E. For example, the spectrum analyzer 22 may present the deconvolved energy-loss spectrum E for viewing by a user. Alternately, or in addition, the deconvolved energy-loss spectrum E may be provided to a processing unit (not shown in FIG. 2) for further analysis, for example to seek to determine the nature of the source of the gamma rays from the determined energy loss spectrum E.

There are various aspects of the design of the example gamma ray detector 13 of the gamma ray spectrometer 12 represented in FIG. 2 which contribute towards enhancing the light collection efficiency of the detector.

Firstly, the tapering nature of the scintillation body 14, whereby it reduces in cross-sectional width with increasing distance away from the base surface 26, helps direct photons interacting with the lateral surface 30 towards the base surface 26 coupled to the photodetector 20, and thereby increases the likelihood of photodetection for these photons.

Photons which are incident on the lateral surface at an angle which is greater than the critical angle for TIR while moving generally towards the base surface 26 are totally internally reflected from the lateral surface 30. The inclination of the lateral surface 30 relative to the axis of extent 32 for the scintillation body causes a TIR reflected photon to be directed towards the photodetector 20 on a path which is more parallel to the axis of extent of the scintillation body 14 than its path before reflection. This reduces the likelihood of the photon undergoing another interaction with the lateral surface, and furthermore shortens the overall distance the photon must travel within the scintillation body to reach the photodetector. Both these effects gives rise to an increased likelihood of photodetection for the photon, and hence an increase in light collection efficiency for the detector.

Photons which are incident on the lateral surface at an angle which is less than the critical angle for TIR while moving generally towards the base surface 26 leave the scintillation body and are reflected by the reflecting surface 16 back into the scintillation body. The inclination of the reflecting surface 16 relative to the axis of extent of the scintillation body causes such a reflected photon to be directed towards the photodetector 20 on a path which is more parallel to the axis of extent of the scintillation body 14 than its path before reflection. This reduces the likelihood of the photon undergoing another interaction with the lateral surface, and furthermore shortens the overall distance the photon must travel within the scintillation body to reach the photodetector. As for the TIR photons, both these effects gives rise to an increased likelihood of photodetection for the photon, and hence an increase in light collection efficiency for the detector.

Conversely, a photon which is incident on the lateral surface while moving generally away from the base surface 26 is reflected (either by TIR at the lateral surface or from the reflecting surface 16 depending on incidence angle) on a path which is more inclined to the axis of extent of the scintillation body 14 than its path before reflection. Such a photon may thus undergo multiple reflections that will in effect steer its path back towards the base surface 26. If the photon strikes the end surface 28 during this process, this will also act to redirect the photon towards the base surface, which again increases the overall likelihood of photodetection.

Furthermore, the tapering (reduction in cross-sectional width) in the example of FIG. 2 is provided for all faces of the lateral surface. That is to say, taking the axis of extent 32 of the scintillation body 14 as a first direction, the cross-sectional width of the scintillation body 14 in a plane perpendicular to the first direction decreases with increasing distance from the base surface 26 in a second direction which is orthogonal to the first direction, and also in a third direction which is orthogonal to both the first direction and the second direction. This tapering in two orthogonal directions can further help maximise the overall effect of directing of photons towards the end of the scintillation body coupled to the photodetector.

It will be appreciated there are many aspects of the gamma ray detector/spectrometer configuration represented in FIG. 2 which may be modified in accordance with other embodiments of the invention. For example, different forms of truncated cone may be adopted for the scintillation body 14. Thus, instead of a truncated cone having a square-shaped base surface, truncated cones with other shapes of base surface may instead be used.

Figure 3:
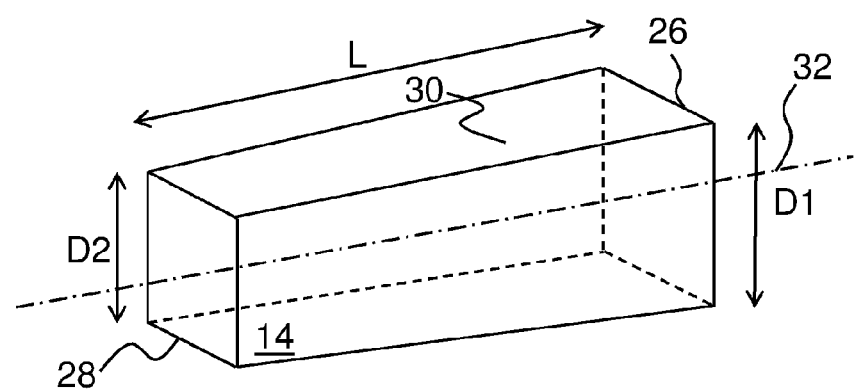
FIG. 3 schematically shows in perspective view a scintillation body of the scintillator-based gamma ray detector of FIG. 2.
Figure 4A:
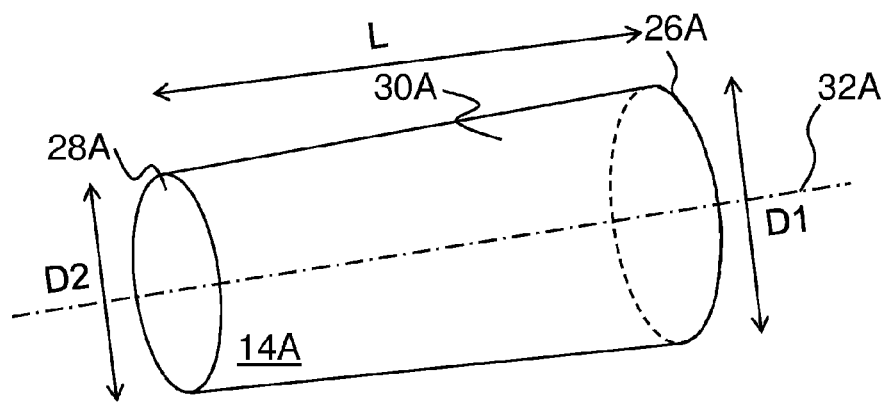
FIGS. 4A and 4B schematically show perspective views of scintillation bodies for scintillator-based gamma ray detectors according to other embodiments of the invention.

FIG. 4A schematically represents in perspective view an alternate scintillation body 14A that may be used in place of the scintillation body 14 of FIGS. 2 and 3 in a gamma ray detector according to another embodiment of the invention. The scintillation body 14A represented in FIG. 4A is in many respects (e.g. in terms of its material(s) and characteristic dimensions) similar to, and will be understood from, the scintillation body 14 represented in FIGS. 2 and 3. However, the scintillation body 14A of FIG. 4A differs from the situation body 14 of FIGS. 2 and 3 in terms of its shape. In particular, the scintillation body 14A of FIG. 4A is based on a truncated cone having a circular base surface as opposed to a square base surface. The truncated cone forming the scintillation body 14A is thus defined by a base surface 26A and an end surface 28A separated along an axis of extent 32 of the scintillation body with a lateral surface 30A extending therebetween. Thus the form of the truncated cone comprising the scintillation body 14A follows that of a right circular cone. That is to say, the cross-section of the truncated cone forming the scintillation body in a plane perpendicular to its axis of extent 32 is generally circular. The base surface 26A has a diameter (characteristic extent/width) D1 and the end surface 28A has a diameter (characteristic extent/width) D2. The scintillation body has a length L along its axis of extent 32. In this specific example the base surface 26A has a width (characteristic extent/diameter) of D1=80 mm, the end surface 28A has a width (characteristic extent/diameter) of D2=60 mm, and the scintillation body has a length (characteristic extent) of L=800 mm. Thus the scintillation body has a volume of around 3 liters and the internal angle between the base end 26A and the respective faces comprising the lateral surface 30 is just over 89 degrees. The characteristic extent of the base surface 26A is approximately 1.3 times larger than the characteristic extent of the end surface 28A, and consequently, the area of the base surface 26A for this particular example is approximately 1.8 times larger than the area of the end surface 28A.

A gamma ray detector comprising a scintillation body based on a right circular cone may in some respects be more efficiently matched to a photomultiplier tube having a circular sensitive surface. However, it will typically be easier to provide a reflecting surface adjacent the lateral surfaces of a scintillation body which comprises generally flat faces than for a curved surface. That is to say, it will typically be simpler to provide a reflecting surface adjacent the lateral surface of a scintillation body based on a polygonal cone (i.e. a truncated cone having a polygonal base surface and a correspondingly shaped polygonal end surface).

Figure 4B:
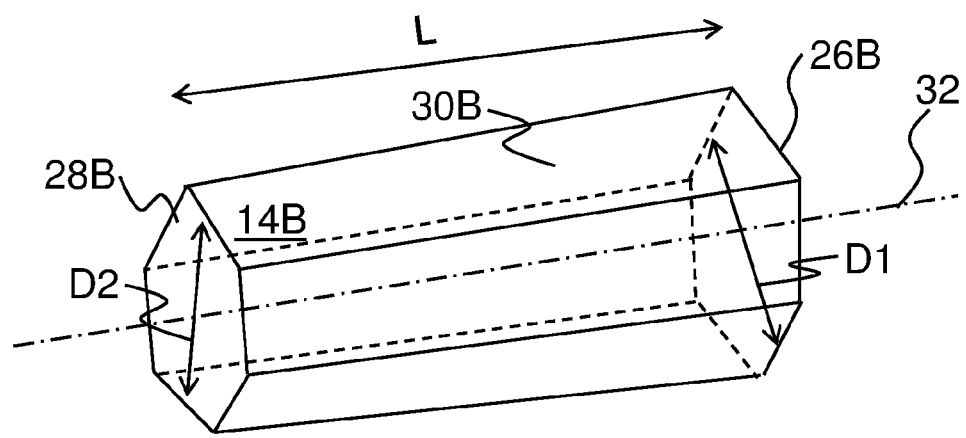

FIG. 4B schematically represents in perspective view another alternate scintillation body 14B that may be used in place of the scintillation body 14 of FIGS. 2 and 3 in a gamma ray detector according to another embodiment of the invention. The scintillation body 14B represented in FIG. 4B is again in many respects similar to, and will be understood from, the scintillation body 14 represented in FIGS. 2 and 3. However, the scintillation body 14B of FIG. 4B again differs from the situation body 14 of FIGS. 2 and 3 in terms of its shape. In particular, the scintillation body 14B of FIG. 4B is based on a truncated cone having a hexagonal base surface as opposed to a square base surface. The truncated cone forming the scintillation body 14B is thus defined by a base surface 26B and an end surface 28B separated along an axis of extent 32 of the scintillation body with a lateral surface 30B extending therebetween. Thus the form of the truncated cone comprising the scintillation body 14B follows that of a right hexagonal pyramid. That is to say, the cross-section of the truncated cone forming the scintillation body in a plane perpendicular to its axis of extent 32 is generally hexagonal. The base surface 26B has a width between flats (characteristic extent) D1 and the end surface 28B has a width between flats (characteristic extent) D2. The scintillation body 14B has a length L along its axis of extent 32. In this specific example the base surface 26B has a width (characteristic extent) of D1=80 mm, the end surface 28B has a width (characteristic extent/diameter) of D2=60 mm, and the scintillation body has a length (characteristic extent) of L=800 mm Thus the scintillation body has a volume of around 3.5 liters and the internal angle between the base end 26B and the respective faces comprising the lateral surface 30 is just over 89 degrees. The characteristic extent of the base surface 26B is approximately 1.3 times larger than the characteristic extent of the end surface 28B, and consequently, the area of the base surface 26B for this particular example is approximately 1.8 times larger than the area of the end surface 28B.

It will be appreciated that other sizes and shapes of scintillation body may be used.

For example, a scintillation body in accordance with an embodiment of the invention having a volume greater than: 1; 2; 3; 5; 10; 15; 20; 25 or 30 liters may be used according to the application at hand. Larger volume detectors will typically provide greater sensitivity.

Larger volume scintillation bodies will typically have a corresponding larger base surface area. For example, a scintillation body in accordance with an embodiment of the invention may have a base surface area that is at least: 1000 mm$^2$; 1500 mm$^2$; 2000 mm$^2$; 2500 mm$^2$; 3000 mm$^2$; 5000 mm$^2$; 10,000 mm$^2$; 15,000 mm$^2$; 20,000 mm$^2$ and 25,000 mm$^2$.

Larger volume scintillation bodies will also typically have a corresponding larger end surface area. For example, a scintillation body in accordance with an embodiment of the invention may have an end surface area that is at least: 500 mm$^2$; 1000 mm$^2$; 1500 mm$^2$; 2000 mm$^2$; 2500 mm$^2$; 3000 mm$^2$; 5000 mm$^2$; 10,000 mm$^2$; 15,000 mm$^2$ and 20,000 mm$^2$.

Larger volume scintillation bodies will also typically have a corresponding larger length along their axis of extent. For example, a scintillation body in accordance with an embodiment of the invention may have a length that is at least: 300 mm; 400 mm; 500 mm; 600 mm; 700 mm; 800 mm; 900 mm; 1000 mm; 1100 mm; 1200 mm; 1300 mm; 1400 mm; 1500 mm; 1600 mm; 1700 mm; 1800 mm; 1900 mm and 2000 mm. It will be appreciated that while longer scintillation bodies can provide increased volumes of detecting material they may be associated with lower light collection efficiency due to increased attenuation.

For different sizes scintillation body, the extent of tapering may be broadly the same and the area of the base surface of the scintillation body may be greater than the area of the end surface of the scintillation body by a ratio in accordance with some embodiments of 1.3 to 2.0, for example 1.4 to 1.9, or 1.5 to 1.8. An interior angle between the base surface of a scintillation body in accordance with an embodiment of the invention and the lateral surface of the scintillation body in a plane that is normal to the lateral surface may, for example, be greater than: 75 degrees; 80 degrees; 85 degrees; 86 degrees; 87 degrees; 88 degrees and 89 degrees for different implementation. Typically a small interior angle will increase the preferential reflecting of photons towards the base surface, thereby increasing LCE, but will typically also result in a larger variation in LCE. Thus, a compromise may be made according to the application at hand.

Some example dimensions associated with gamma detectors according to different embodiment of the invention are presented in Tables 1 and 2. Table 1 shows some example values for gamma ray detectors based on a right square cone (such as represented in FIGS. 2 and 3) and Table 2 shows some example values for gamma ray detectors based on a right circular cone (such as represented in FIG. 4A).

TABLE 1

Example characteristics for square cone detectors

| D1 (mm) | D2 (mm) | Length (mm) | Volume (litres) | PMT diameter (inches) |
|---|---|---|---|---|
| 50 | 40 | 500 | 1.0 | 2 |
| 50 | 40 | 700 | 1.4 | 2 |
| 50 | 40 | 1000 | 2.0 | 2 |
| 80 | 60 | 600 | 3.0 | 3 |
| 80 | 60 | 800 | 3.9 | 3 |
| 80 | 60 | 1000 | 4.9 | 3 |

TABLE 1-continued

Example characteristics for square cone detectors

| D1 (mm) | D2 (mm) | Length (mm) | Volume (litres) | PMT diameter (inches) |
|---|---|---|---|---|
| 130 | 100 | 800 | 10.6 | 5 |
| 130 | 100 | 1000 | 13.3 | 5 |
| 130 | 100 | 1250 | 16.6 | 5 |
| 130 | 100 | 1500 | 20.0 | 5 |

TABLE 2

Example characteristics for circular cone detectors

| D1 (mm) | D2 (mm) | Length (mm) | Volume (litres) | PMT diameter (inches) |
|---|---|---|---|---|
| 50 | 40 | 500 | 0.8 | 2 |
| 50 | 40 | 700 | 1.1 | 2 |
| 50 | 40 | 1000 | 1.6 | 2 |
| 80 | 60 | 600 | 2.3 | 3 |
| 80 | 60 | 800 | 3.1 | 3 |
| 80 | 60 | 1000 | 3.9 | 3 |
| 130 | 100 | 800 | 8.4 | 5 |
| 130 | 100 | 1000 | 10.4 | 5 |
| 130 | 100 | 1250 | 13.1 | 5 |
| 130 | 100 | 1500 | 15.7 | 5 |

Modelled performance characteristics for some specific example configurations of gamma ray detector in accordance with embodiments of the invention are presented in Tables 3 and 4. Table 3 shows data for gamma ray detectors based on a right square cone (such as represented in FIGS. 2 and 3) and Table 4 shows data for gamma ray detectors based on a right circular cone (such as represented in FIG. 4A).

TABLE 3

Modelled performance characteristics for a square cone detector

| D1 (mm) | D2 (mm) | Length (mm) | Volume (litres) | PMT diameter (inches) | LCE | LCE variance |
|---|---|---|---|---|---|---|
| 50 | 40 | 700 | 1.4 | 2 | 38% | 2.1% |
| 80 | 60 | 800 | 3.9 | 3 | 39% | 3.4% |
| 130 | 100 | 1500 | 20.0 | 5 | 39% | 2.8% |

TABLE 4

Modelled performance characteristics for circular cone detector

| D1 (mm) | D2 (mm) | Length (mm) | Volume (litres) | PMT diameter (inches) | LCE | LCE variance |
|---|---|---|---|---|---|---|
| 50 | 40 | 700 | 1.1 | 2 | 34% | 5% |
| 80 | 60 | 800 | 3.1 | 3 | 45% | 4% |
| 130 | 100 | 1000 | 10.4 | 5 | 45% | 4% |

The values for LCE and LCE variance represented in Tables 3 and 4 compare favourably with corresponding values for conventional plastic scintillator based gamma ray detectors. For example, corresponding modelled performance characteristics for a gamma ray detector having a conventional planar scintillation body with a volume of 26 liters suggest an LCE of 29% and a variance in LCE of 2.4%. Thus, the modelled values for LCE for detectors in accordance with embodiments of the invention can be seen to be generally higher than for broadly corresponding conventional detectors.

Thus a gamma ray detector has been described. The detector comprises a plastic scintillation body for receiving gamma rays and generating photons in response thereto. The scintillation body is in the form of a truncated cone defined by a base surface and an end surface separated along an axis of extent of the scintillation body with a lateral surface extending therebetween. A photodetector is optically coupled to the base surface of the scintillation body so as to detect photons generated by gamma ray interaction events within the scintillation body. A specular reflector is provided adjacent, but separated from, the lateral surface of the scintillation body so as to reflect photons that leave the scintillation body through the lateral surface back into the scintillation body.

It will be appreciated from the above description, the term "cone" is used herein in its general mathematical sense of a being solid figure bounded by a plane base and a surface formed by the locus of all straight line segments joining an apex to the perimeter of the base. In particular, it should be noted the term "cone" is not restricted to (although it does include) such shapes having a circular base. A truncated cone is a cone having a section including the apex removed.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] GB 2 437 979 (Symetrica Limited)
[2] GB 2 418 015 (Symetrica Limited)
[3] GB 2 463 707 (Symetrica Limited)
[4] N. J. Cherepy et al, Nuclear Science Symposium, Paper N41-3 Conference record (Anaheim) 2012

The invention claimed is:

1. A gamma ray detector comprising:
   a plastic scintillation body for receiving gamma rays and generating photons in response thereto, wherein the scintillation body is in the form of a truncated cone defined by a base surface and an end surface separated along an axis of extent of the scintillation body with a lateral surface extending therebetween, the base surface being larger than the end surface;
   a photodetector optically coupled to the base surface of the scintillation body so as to detect photons generated by gamma ray interaction events within the scintillation body; and
   a specular reflector provided adjacent the lateral surface of the scintillation body and separated by a gap therefrom so to reflect photons that leave the scintillation body through the lateral surface back into the scintillation body.

2. The gamma ray detector of claim 1, wherein the scintillation body has a volume of at least an amount selected from the group comprising: 1; 2; 3; 5; 10; 15; 20; 25 and 30 liters.

3. The gamma ray detector of claim 1, wherein the base surface of the scintillation body has an area of at least an amount selected from the group comprising: 1000 $mm^2$; 1500 $mm^2$; 2000 $mm^2$; 2500 $mm^2$; 3000 $mm^2$; 5000 $mm^2$; 10,000 $mm^2$; 15,000 $mm^2$; 20,000 $mm^2$ and 25,000 $mm^2$.

4. The gamma ray detector of claim 1, wherein the end surface of the scintillation body has an area of at least an amount selected from the group comprising: 500 $mm^2$; 1000 $mm^2$; 1500 $mm^2$; 2000 $mm^2$; 2500 $mm^2$; 3000 $mm^2$; 5000 $mm^2$; 10,000 $mm^2$; 15,000 $mm^2$ and 20,000 $mm^2$.

5. The gamma ray detector of claim 1, wherein the area of the base of the scintillation body is greater than the area of the end surface of the scintillation body by a ratio in a range selected from the group comprising: 1.3 to 2.0; 1.4 to 1.9; and 1.5 to 1.8.

6. The gamma ray detector of claim 1, wherein the length of the scintillation body along its axis of extent is at least an amount selected from the group comprising: 300 mm; 400 mm; 500 mm; 600 mm; 700 mm; 800 mm; 900 mm; 1000 mm; 1100 mm; 1200 mm; 1300 mm; 1400 mm; 1500 mm; 1600 mm; 1700 mm; 1800 mm; 1900 mm and 2000 mm.

7. The gamma ray detector of claim 1, wherein an interior angle between the base surface of scintillation body and the lateral surface of the scintillation body in a plane that is normal to the lateral surface is greater than at least an amount selected from the group comprising: 75 degrees; 80 degrees; 85 degrees; 86 degrees; 87 degrees; 88 degrees and 89 degrees.

8. The gamma ray detector of claim 1, wherein the base surface of the scintillation body has a shape corresponding to a regular polygon.

9. The ray detect claim 1, where the scintillation body is in the form of a truncated circular cone.

10. The gamma ray detector of claim 1, wherein a width of the base surface of the scintillation body is matched to a width of the photodetector's sensitive surface.

11. The gamma ray detector of claim 1, wherein the scintillation body comprises polyvinyltoluene and/or polystyrene and/or polyethylene naphthalate and/or 9-vinyl carbozole and/or a fluor loaded nano-composite material.

12. The gamma ray detector of claim 1, wherein the lateral surface of the scintillation body consist of machined faces.

13. The gamma ray detector of claim 1, wherein the specular reflector adjacent the lateral surface comprises a metallic surface.

14. The gamma ray detector of claim 1, wherein the specular reflector adjacent the lateral surface comprises a reflecting film on a substrate.

15. The gamma ray detector of claim 1, further comprising an end-reflector optically bonded to the end surface of the scintillation body.

16. The gamma ray detector of claim 1, further comprising a light guide element for optically coupling the base surface of the scintillation body to the photodetector.

17. A gamma ray spectrometer comprising thee gamma ray detector of claim 1 and a spectrum analyser configured to receive output signals from the photodetector and to generate an energy loss spectrum for gamma-ray interactions in the scintillation body therefrom.

18. The gamma spectrometer of claim 17, wherein the spectrum analyser is further configured to processing the energy loss spectrum by deconvolution using a response function computed for gamma ray detector.

19. A method of detecting gamma rays comprising:
   providing a scintillation body for receiving gamma rays and generating photons in response thereto, wherein the scintillation body is in the form of a truncated cone defined by a base surface and an end surface separated along an axis of extent of the scintillation body with a lateral surface extending therebetween, the base surface being larger than the end surface;

providing a photodetector optically coupled to the base surface of the scintillation body so as to detect photons generated by gamma ray interaction events within the scintillation body;

providing a specular reflector provided adjacent the lateral surface of the scintillation body and separated by a gap therefrom so as to reflect photons that leave the scintillation body through the lateral surface back into the scintillation body; and detecting output signal from the photodetector.

* * * * *